J. A. WERNER.
CASH REGISTER.
APPLICATION FILED NOV. 19, 1909.
1,146,983.
Patented July 20, 1915.
6 SHEETS—SHEET 1.
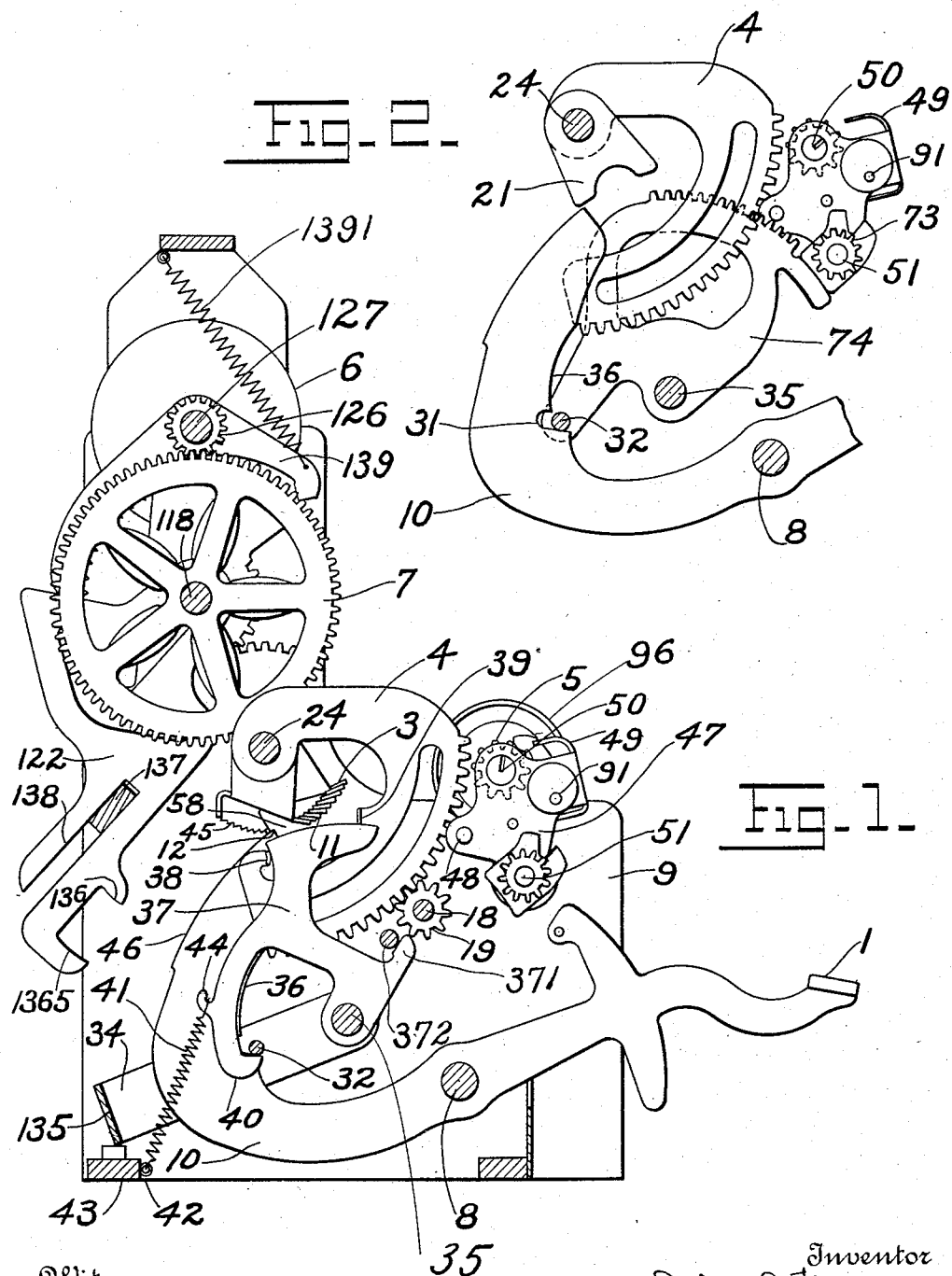

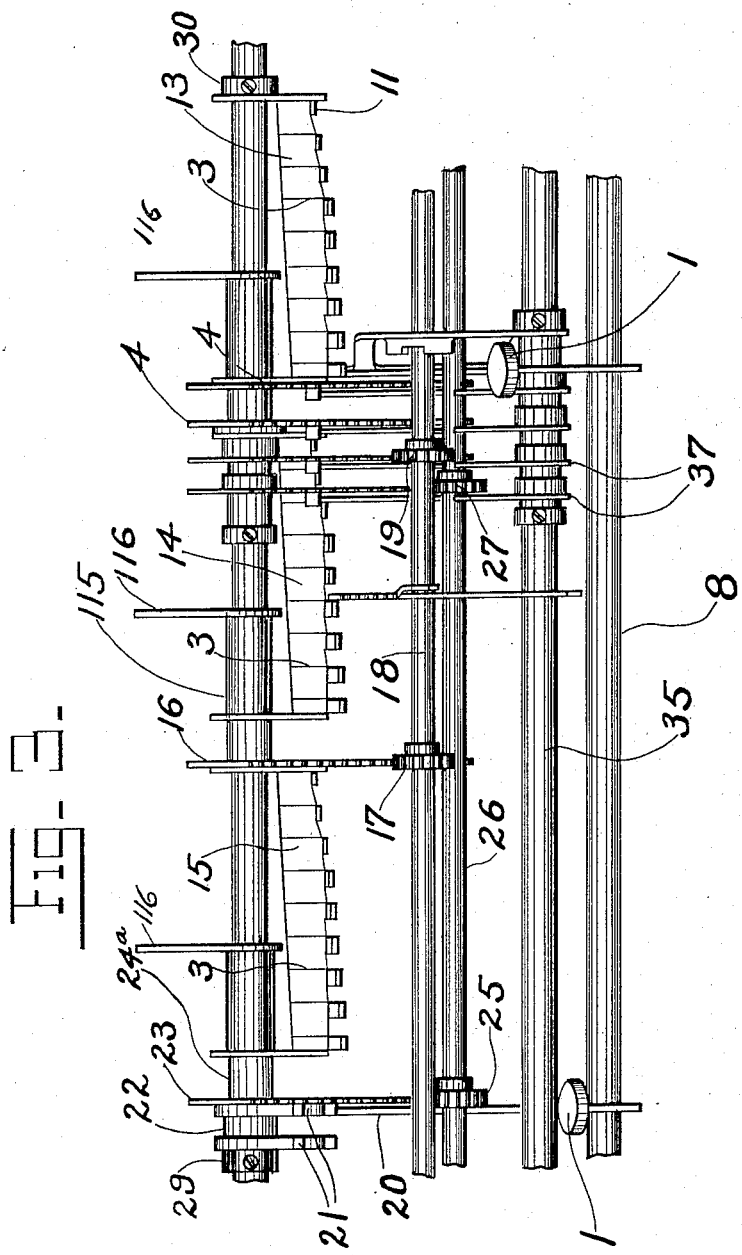

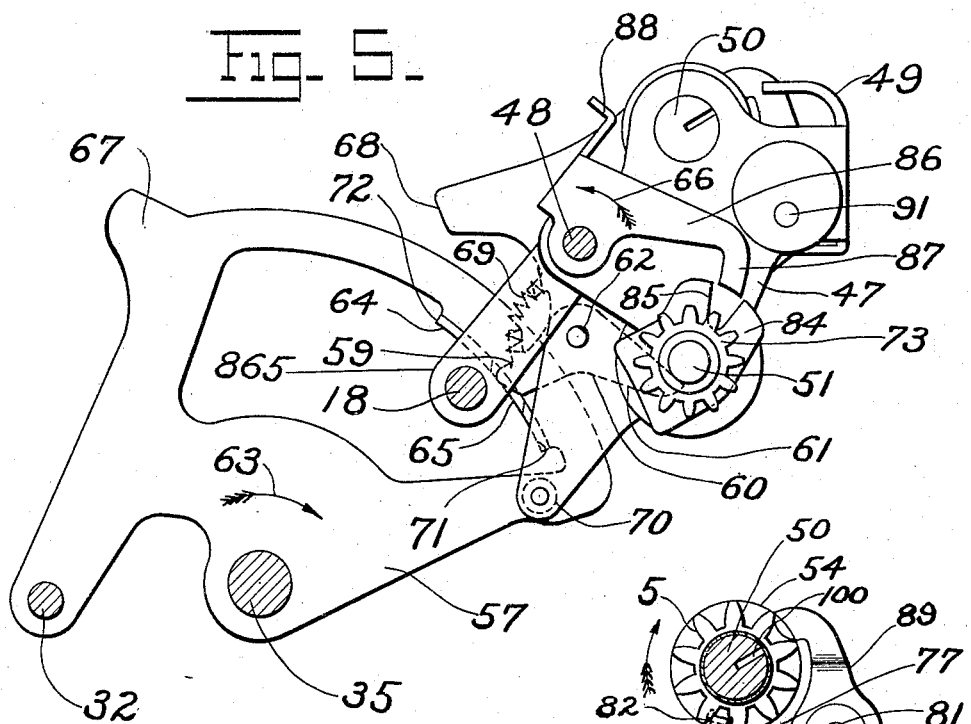
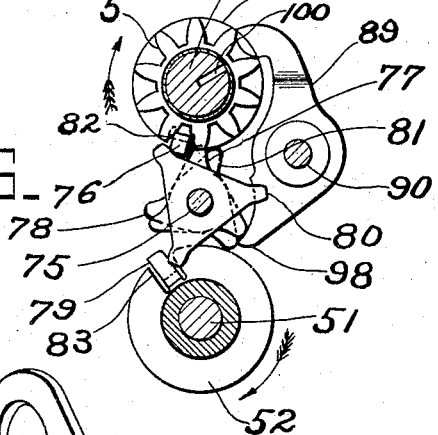
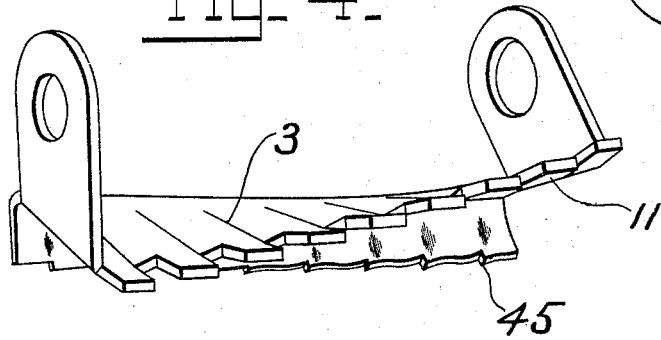

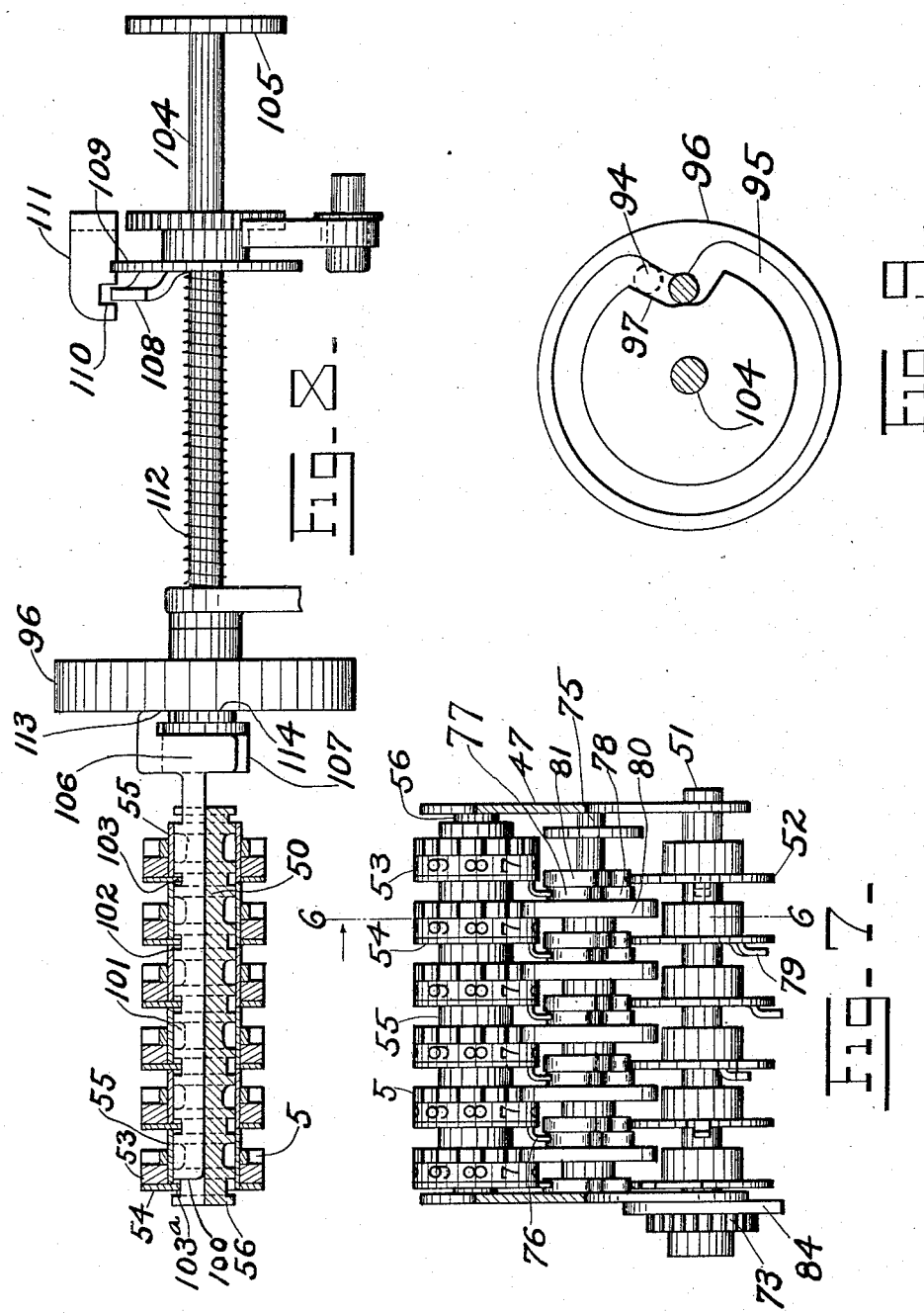

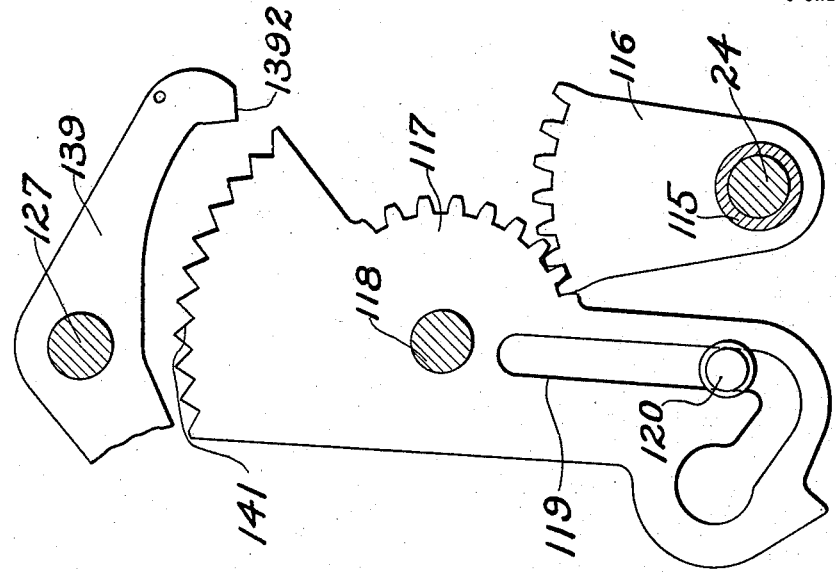
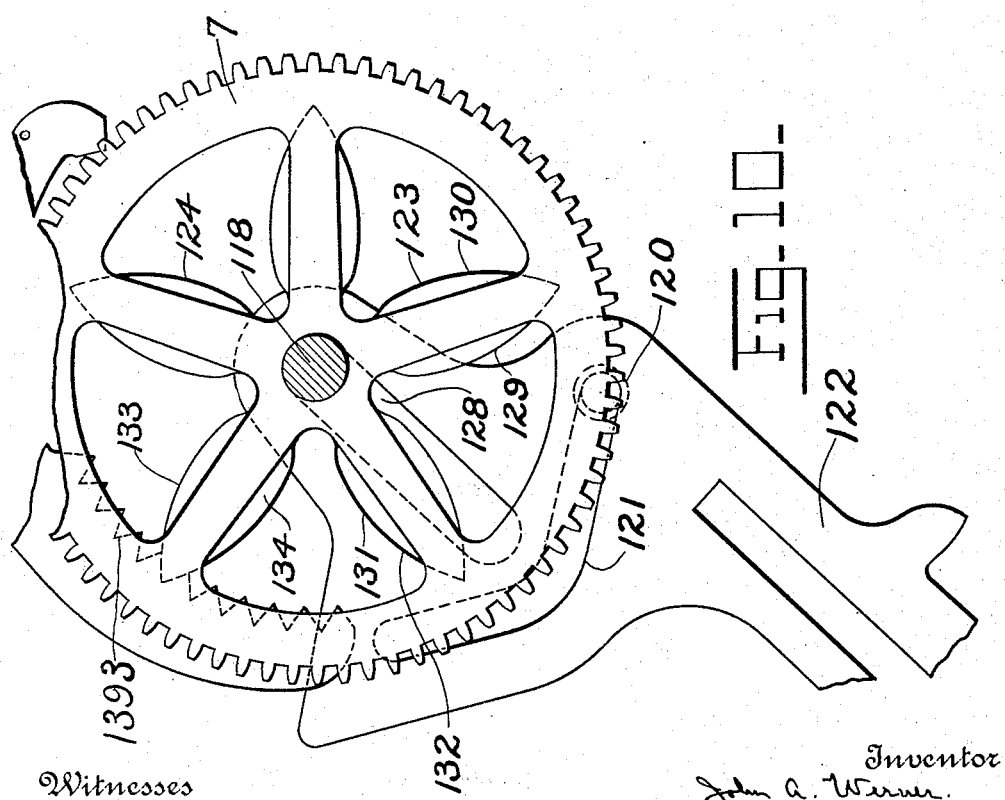

J. A. WERNER.
CASH REGISTER.
APPLICATION FILED NOV. 19, 1909.
1,146,983.
Patented July 20, 1915.
6 SHEETS—SHEET 6.
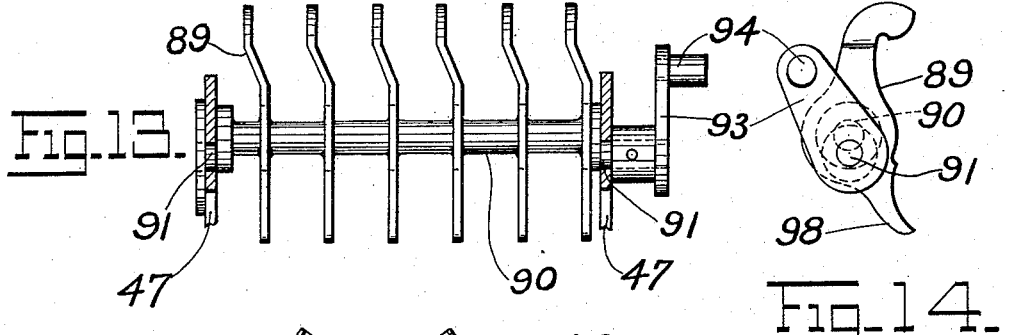
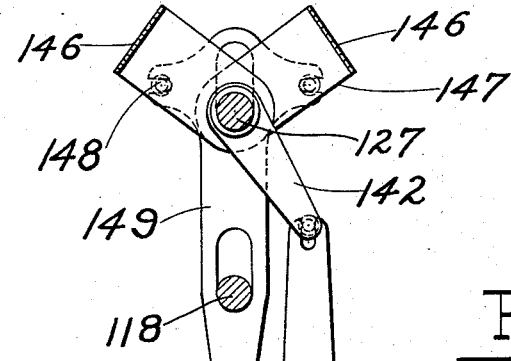
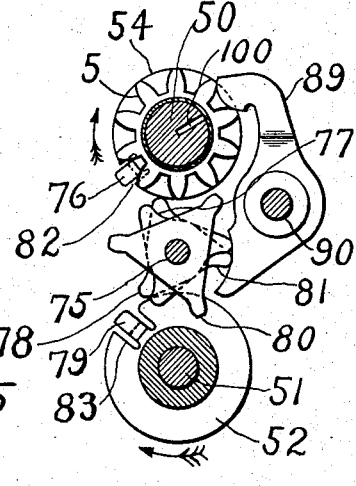

UNITED STATES PATENT OFFICE.

JOHN A. WERNER, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,146,983.  Specification of Letters Patent.  Patented July 20, 1915.

Application filed November 19, 1909. Serial No. 528,920.

*To all whom it may concern:*

Be it known that I, JOHN A. WERNER, a citizen of the United States, residing at Dayton, in the county of Montgomery and State of Ohio, have invented certain new and useful Improvements in Cash-Registers, of which I declare the following to be a full, clear, and exact description.

This invention relates to cash registers and has for its main object to provide a device of the class mentioned which may be constructed at a low cost, but without sacrificing accuracy of operation or durability.

The mechanism as shown is of the so-called key-operated type of machine, the parts mostly being punched from sheet metal thereby tending to permit a low cost and being also easily assembled into a complete machine. Certain of the features to be described are nevertheless adaptable to machines of other types than the key-operated mechanism, in connection with which they are shown.

Among the main objects of the construction are to provide an improved differential mechanism comprising graduated frames and means for locking the frames at the end of the key stroke so as to prevent overthrow.

A further improvement comprises a novel construction of totalizer in which the elements are normally positively locked and are released only when they are to be operated or when a transfer is to take place, together with the provision of improved devices for engaging and disengaging the totalizer elements with their operating mechanism. The transfer mechanism also presents novel features, it being of the type in which disks having cutaway portions are tripped by the totalizer elements and then are given a further movement to effect or turn in the transfer.

An additional object is to provide an improved key coupler mechanism and novel connections whereby the key coupler may operate a number of the moving parts of the machine.

A further object is to provide an improved construction of indicating mechanism, the construction disclosed being of the well known type of rotary indicators, but having operating devices such that the indicators do not return to zero position between operations of the machine, but are set directly and by the nearer of the two possible ways from a preceding to a subsequent position.

A still further object is to provide an improved indicator operating construction with which the indicators are positively positioned by an operation of the keys and so as to move them directly from one position to any other desired one without first returning the indicators to some intermediate position.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings: Figure 1 is a transverse vertical section showing the characteristic parts of the machine. Fig. 2 is a vertical detail section showing the transfer operating devices and the operating rack of highest denomination. Fig. 3 is a detail front elevation of the differential mechanism as a whole. Fig. 4 is a perspective detail of one of the graduated frames. Fig. 5 is a detail vertical section showing the mechanism for engaging the totalizer with its operating devices. Fig. 6 is a detail on line 6—6 of Fig. 7 showing one of the totalizer elements and the transfer operating mechanism therefor. Fig. 6$^a$ is a view somewhat similar to Fig. 6 showing the transfer devices partially operated. Fig. 7 is a front elevation of the totalizer and transfer mechanism. Fig. 8 is a section showing the zero resetting mechanism for the totalizer. Fig. 9 is a detail of a cam forming part of the zero setting mechanism. Fig. 10 is a view showing the indicator operating devices. Fig. 11 is a detail showing the setting or positioning devices for the indicator. Fig. 12 is a detail showing the flash operating mechanism and certain lock actuating devices. Fig. 13 is a view of certain pawls employed for locking the totalizer elements. Fig. 14 is a view at right angles to Fig. 13 showing the same pawls.

The mechanism herein described is of the general type known as key-operated, that is, the type in which the keys themselves directly furnish power for operating the rest of the mechanism. The keys are positioned to coöperate with a key coupler having a somewhat novel form, the key coupler being connected to operate the transfer devices, to position the indicators and to actuate certain locking devices for various parts. The totalizer is composed of a series of elements of different denominations herein shown as cylinders, all being mounted in a pivoted frame whereby they may be thrown into and out of engagement with certain operating racks which have their motion directly determined by the keys. The totalizer elements are constructed to be positively locked at all times except when released to be actuated by the operating racks or by the transfer mechanism, this locking function being performed by certain locking pawls which are constructed to be withdrawn from the totalizer elements at the proper times.

The indicators as herein shown are of the well known rotary cylinder type, but they are adapted to be moved in either direction and by the shorter of the two possible routes, directly from a preceding to a subsequent position, without being reset to zero. To accomplish this function, an element having radiating arms is attached to each indicator and mechanism including a roller is constructed to be positioned and to operate against the radiating arms and thereby to set the indicator. With this general statement, the specific description may be taken up and reference will be first made to the differential mechanism.

The keys, usual in this type of machine, are indicated by the numeral 1 and are mounted in banks on a rod 8 around which they move. The keys are all similar and are provided at their rear ends with upwardly extending portions 10, these portions being all similar and being adapted to engage the arms of graduated frames 3, one of which is shown separately in Fig. 4, in order to produce a differential movement of said frames. As will be seen in Fig. 4 these frames are composed of a single piece of sheet metal stamped and bent to the required shape, comprising two upwardly extending arms having pivot holes therein and a series of steps 11 arranged in different positions together with an additional set of graded steps or graduations 45 which project downwardly. As seen in Fig. 1, the graduations 11 are directly over the upper ends 12 of the keys, the consequence being that when the keys are depressed the upper ends 12 thereof engage and rotate the graduated frames differentially, depending on the keys depressed. The keys have all the same extent of stroke. This operation will be evident from the drawings, but the downwardly extending graduations 45 provide an additional control whereby to prevent overthrow of the graduated frames. It will be seen from Fig. 1 that the graduations 45 are arranged in a manner substantially the same as the graduations 11, that is, the distance between any one pair of graduations which coöperate with a particular key, is the same. From this construction it follows, that as the key rises, the rear edge 46 thereof, which is circular from the center of rod 8, will finally be engaged by the corresponding graduation 45, at which time the frame 3 will be locked, inasmuch as a graduation of each set engages the rear edge of the key. This locked position will be reached somewhat before the end of the key stroke and it is clear that during the remainder of the stroke the circular edge 46 will ride past the graduation of both sets.

Each of the graduated frames 3 is connected to a segment gear 4 one of which is well shown in Fig. 1. Referring to Fig. 3, the units graduated frame 3 is connected directly to the right-hand segment gear 4 and the tens frame 3 is connected directly to the next segment gear 4, from the right-hand. The dollars graduated frame 3 which is the third from the right in this figure is connected rigidly to a segment gear 16, but the movement of this gear is transmitted to a segment gear 4, the third from the right of the set of gears 4, through pinions 17 and 19 fast on a shaft 18. The object of this construction is merely to arrange the operating segment gears 4 closely together. No complete bank of tens of dollars keys is shown, though one may readily be employed if desired. From Fig. 3 it will be seen that two camming elements 21 are provided and that in connection with one of them, a key 1 is shown. The shape of these cam elements 21 is well shown in Fig. 2 and it will be understood that in practice, a key will also engage the left-hand one of the two cams. These cams are rigidly mounted on a sleeve 22 surrounding the shaft 24 and rigidly fastened to this sleeve is a driving gear segment 23. This segment is connected to drive the left-hand one of the operating segment gears 4 through pinions 25 and 27 rigidly mounted on a shaft 26. From this description it will be seen that there are four operating segment racks 4 provided to engage four separate totalizer elements, and that each of these is connected either directly or through intermediate gearing to graduated devices which are directly operated by the keys.

Before passing to a description of the totalizer mechanism 6, a short reference may be made to the key coupler, inasmuch as this has much to do with operating various parts of the machine. In this machine, the key coupler comprises two side arms 34 connected by a cross rod 32 and a rear bar 135, the whole frame being journaled loosely on a rod 35 slightly above and to the rear of the key supporting rod 8. Each key is provided with a notch 31 which is adapted to surround the cross rod 32 of the coupler when the keys are operated. This mechanism is very readily understood, inasmuch as key coupler mechanism is well known in the art, and it will be readily evident that the depression of any key will serve to elevate the coupler and that any key may be made to complete the stroke of all keys which are started at the same time.

The totalizer mechanism as before stated comprises a series of denominational elements, all of which are mounted in a pivoted frame. Referring to Fig. 7, it will be seen that frame pieces 47 support the totalizer elements, each of which comprises a pinion 5, a numbered cylinder or wheel 53 and a transfer tripping disk 54. Each of the transfer tripping disks 54 has a projection stamped or bent out and indicated by numeral 76 these serving to trip the transfer mechanism as will be readily understood. The frame pieces 47 and consequently the whole totalizer mechanism is journaled on a rod 48 and is provided with a downwardly extending arm (see Fig. 5) and a rearwardly extending arm indicated by numeral 68. A segment 57 shown in this figure is journaled loosely on the key coupler shaft 35 and is connected to the cross-rod 32 of the key coupler so as to move rigidly therewith in both directions. Near the upper side of this segment 57, a flange 64 is bent up having a cutaway portion 65. Mounted in a convenient place on the totalizer frame 47 as indicated at 62 is a pawl 60 having a downwardly extending end, normally resting in the cutaway portion 65 of the flange 64 and having a forwardly extending end 61 normally resting on a shaft 51 in the totalizer frame, this shaft being a part of the transfer mechanism. A spring 69 is compressed between projecting parts of the rearward extension 68 of frame 47 and the downwardly extending end 59 of the pawl 60. The parts in Fig. 5 are shown in normal position and it will be clear that when the key coupler is elevated and the segments 57 rocked in the direction of the arrow 63 the flange 64 will engage the lower end 59 of pawl 60, and inasmuch as this pawl engages with the shaft 51 and is therefor immovable relative to the totalizer frame 47, it will rock the whole frame around its supporting rod 48 thereby moving the totalizer pinions 5 into engagement with the rack segments 4. This will be clear from a study of Figs. 1 and 2 wherein the totalizer elements and frame are shown in normal position and out of mesh with the operating segments 4. When the frame is so rocked, a roller 70 on the downwardly extending part thereof is moved out side the path of flange 64 and rides thereon during the continued movement of the flange and segment 57. At the end of the forward movement of this segment, the projection 67 thereon engages the rearward arm 68 of the totalizer frame and cams it upward as will be readily understood from Fig. 5, thereby reversely rocking the totalizer frame around its rod 48 and withdrawing the pinions 5 from mesh with the operating segments. In this position of the parts, the withdrawing movement of the frame will not be prevented by the roller 70 as flange 64 has passed completely under the said roller. Before the return movement of segment 57, that is, before the downward movement of the key coupler, the roller 70 will ride under the flange 64 and therefore prevent accidental rocking of the totalizer frame until the end of the rearward stroke of the parts is given, at which time the pawl 60 will again be moved to a position such that its lower end 59 is in the cutaway portion 65 of the flange 64. It will be noted that during the backward stroke of segment 57, the pawl 60 may rock around its pivot 62 so as to have no effect on the totalizer frame.

It was before stated that there are four segment racks 4 shown in the case, but it will be seen from Fig. 7 that six totalizer elements are provided, this construction wherein more elements than operating devices are employed being common in the art. It does follow, however, that the two higher totalizer elements are never operated except by transfer from lower elements and these therefore may be desirably locked at all times except when a transfer is to take place, and may in fact be locked even when the totalizer elements of lower order are engaged with the operating racks. To accomplish this function a locking frame stamped and bent from a single piece of metal is provided and is shown in Fig. 5. This locking device comprises a forwardly extending arm 86 having a projection 87, an upwardly bent arm 88 and a downwardly extending arm 86$b$. As shown in this figure the locking piece is carried by the supporting rod 48 and also surrounds the shaft 18. It will thus be seen that the locking piece is rigidly fast, inasmuch as neither rod 48 nor shaft 18 has any bodily movement. The upwardly extending projection 88 of this piece is so positioned as to be engaged by the totalizer pinions 5 of the two highest denominations when the totalizer is thrown into engagement with the operating devices, so that these wheels are positively locked against operation at such time.

The transfer mechanism may be next referred to. The construction herein shown is such that the totalizer elements are locked at all times except when an operation should take place and this locking is partly controlled by the transfer mechanism. In the device shown each totalizer element has adjacent thereto a set of three starshaped devices, or devices having radiating points, one of each set being positioned to be engaged and moved by the transfer tripping projection of the totalizer and also being adapted to be engaged and further rotated by a series of transfer operating disks. Another one of each set of three radiating elements is positioned to engage and operate the totalizer pinion of next higher order while the third starshaped element is constructed to be locked against operation by the said transfer controlling disks. One of these elements of each set is also adapted to control the totalizer locking pawls. Referring to Figs. 6 and 7, these sets of disks are therein well shown. It will be seen from Fig. 7 that the star 77 of each set is in a position such that the tripping projection 76 of the totalizer elements will engage one of the projections and rotate the system or set of three stars one-sixth of a complete rotation. This one-sixth movement does not cause any effect on the totalizer element of next higher order, but it does bring one of the projections of the element 77 into the path of an operating disk 52 or rather of a stamped out projection 79 thereof, so that when these disks, which have their operating projections successively or helically positioned, are given a rotation, the projections will engage all those stars which have been given a one-sixth rotation and will give them a second one-sixth rotation, this latter movement serving to effect or turn in the transfer to the totalizer element of next higher order. To effect the transfer is the function of the star elements 80. It will be seen from Figs. 6 and 6ª that a one-sixth rotation will bring one of the arms of this star into position such that on further movement it will engage the proper tooth of pinion 5 and move it one-tenth of a rotation, the further movement being as before stated given by the transfer projection 79. The third disk or starshaped element 81 is provided to prevent a transferring movement of the set of stars until the proper time. It will be seen from the position of the star 81 of Fig. 6 that a one-sixth rotation will bring one of the arms thereof into engagement with the disk 52, thereby locking the set of star elements against any further movement, but when the transferring projection 79 of the proper disk 52 reaches the star 77 the cut away portion 83 of the disk 52 will then permit the projection of the star 81 to pass therein so that the second one-sixth rotation of the set of stars may be given. This clearly serves to prevent a transferring movement except by operation of the disks 52. In Fig. 6 are shown a series of pawls 89 journaled loosely on a shaft 90 carried in the totalizer frame 47. The downwardly extending portions 98 of these pawls are positioned to be engaged by projections of the stars 77 so that in the position of Fig. 6 the totalizer elements are positively locked. Clearly, however, when the stars are given a one-sixth rotation, the pawls will then be released so that the transfer may take place, but immediately after having taken place, the pawls are again restored to locking position. It will be noted from Fig. 13 that these pawls are bent so that the upper operating ends thereof are in the plane of the next higher wheel. It is clearly necessary to release these pawls when the totalizer elements are to be actuated by the operating racks 4, but as the whole system shown in Fig. 6 moves as a unit some additional mechanism must be provided to do this; this mechanism is shown in Figs. 9 and 14. It was stated that pawls 89 are mounted on a shaft 90 and from Fig. 14 as well as Fig. 13 it will be seen that shaft 90 is carried eccentrically by pins 91 to one of which is connected a crank arm 93 having a projecting pin 94. This pin 94 rides in a groove 95 of cam 96 as seen in Fig. 9. Under certain conditions the cam is adapted to be rotated but in ordinary operations of the machine, the cam stands still. From this construction it will be clear that as the totalizer frame is moved upward to engage the pinions 5, a relative rotation of the pins 91 will be given, inasmuch as the projecting pin 94 rides in the cam groove 95 from the position shown in full lines in Fig. 9 to that shown in dotted lines. The result of this movement clearly is, to withdraw shaft 90 from the totalizer mechanism and thereby to withdraw the pawls 89 sufficiently to permit operation of the totalizer pinions by the operating racks. As the totalizer sinks back to its withdrawn position the pawls again engage the totalizing wheels.

In order to reset the totalizer to zero position mechanism shown in Fig. 8 is provided. It was stated that the totalizer elements are mounted on the shaft 50 and this shaft as shown in Fig. 8 has a groove 100 in which rides a comb or notched plate 101, having notches 102 in which teeth 103 on the transfer disks 54 normally ride. Clearly, the ordinary rotary movement of the totalizer elements is not prevented as the depending teeth 103 ride in the annular grooves 103ª in the shaft 50. If, however, the comb is moved longitudinally so as to bring the full projections between the notches 102 into the planes of the transfer disks, and the shaft 50 rotated, the totalizer elements will be picked up and restored to normal zero position by such rotation of the shaft. In order to give this rotation as stated, the comb 101 has a construction comprising a flat plate 106 and a bent projection 113 engaging in an annular groove 114 in a shaft 104. The shaft 104 has a plane surface 107 engaging the plate 106 so that rotation of the shaft 104 will cause an equivalent rotation of the plate 106 and consequently of comb 101 and shaft 50. In order to give the rotation to shaft 104 it is provided with a disk 105 which may be manually grasped, but the shaft must be pushed slightly inward so as to move the comb 101 into position to coact with the totalizer elements. When so pushed inward the shaft may be given a complete rotation manually and the totalizer reset, after which a spring 112 engaging a disk 109 serves to push the shaft 104 to its normal outer position. The disk 109 is provided with a bent extension 108 engaging a camming plate 111 having a notch 110 as shown, so that the shaft 104 will be forced positively outward as it reaches its normal position after a rotation. It will be seen that cam 96 which was described in connection with the withdrawal of locking pawls 89 is mounted on this shaft 104 so that when the shaft is rotated the locking pawls 89 will be withdrawn from locking position precisely as they were when the totalizer frame was raised. This is clearly necessary as the totalizer elements could not be reset unless the pawls 89 were first withdrawn from locking position.

Passing now to the indicators and their operating devices it will be remembered that they were said to include rotary cylinders and mechanism for moving them by the shorter of the two possible paths directly to their new positions.

Referring to Fig. 3 it will be seen that each of the differentially graduated frames 3 is connected to a corresponding segment gear 116, the segment gears 116 being each mounted on sleeves 115 to which the graduated frames are also fast. From Fig. 11 it will be clear that these segments 116 are meshed with other segments 117 mounted loosely on a supporting rod 118 and provided with radial slots 119 in which rollers 120 ride. Clearly, as the keys are operated the segments 117 will be given differential movements equivalent in extent to the movement of the keys. The indicators are shown in Fig. 1 and indicated by numeral 6. They are all journaled loosely on a rod 127 and each has fast thereto a pinion 126 meshing with a large gear 7, and to each of these large gears is fast a star shaped element 123, the gears 7 and the star shaped elements being all loose on the rod 118 and positioned immediately beside the differential segments 117 before referred to. Slides 122 one for each bank of keys are carried on the rod 118 and on a rectangular rod 137 riding thereon through slots 128 and 138 respectively so that the slides may move in an upwardly and forwardly direction. Each slide is provided with a slot 121 approximately circular from the rod 118 and the rollers 120 are also adapted to ride in these more or less circular slots. At the lower ends of slides 122 are projections 136 and 1365 adapted to be engaged and operated by the rear rod 135 of the key coupler. When the keys are depressed and the coupler correspondingly elevated it will be clear that the segments 117 are differentially rotated, thus carrying the rollers 120 through a portion of the circular slots 121. After these parts have been set to the desired differential position, the coupler bar 135 engages the projections 136 on the slides 122 and gives the said slides a movement of an invariable extent. By this movement the rollers 120 are compelled to move in the radial slots 119 and will sooner or later engage some one of the radiating arms of the stars 123 and rotate the whole indicator system to the desired proper position. Clearly this mechanism provides for a movement in the shorter of two possible directions for the indicator and of only such extent as is necessary to cause the change from one exhibited number to another. During the reverse stroke of the keys, the coupler bar 135 engages the lower projections 1365 of the slides and returns said slides to their normal position, the differential segments 117 returning with the graduated frames 3 thereafter.

It is desirable to lock the indicators in their adjusted positions, so as to prevent a false movement thereof, and it is also advantageous to lock the indicator controlling devices in any positions to which they may be moved by the keys, and during the movement of the indicators proper. To perform these two functions, mechanism shown in Figs. 10, 11 and 12 is provided. It will be evident that the indicators and their controlling segments are never simultaneously operating, as the segments must be set to determine the movement of the indicators, and because of this fact it is possible to employ a single set of elements to lock both the indicators and their controlling segments, by movement of said set of elements in opposite directions. These locking elements, as shown in Fig. 11, are indicated by numeral 139 and have each two locking parts. The indicator supporting shaft 127 rigidly carries all these elements (see Fig. 1), and they may be drawn in one direction by springs 1391. The forwardly extending arm of the locking elements have each a locking tooth 1392 which when the shaft 127 is rocked will engage the teeth 141 of the indicator controlling segments 117 and hold said segments while the indicators are being operated. Likewise, the rearwardly extending arms of locking elements 139 have cut therein saw teeth 1393, and thus the points of the indicator stars may be engaged by one of the saw teeth, no matter what position the star may assume, when the shaft 127 is rocked in a reverse direction. It will thus be seen that the locking of both the indicators and their controlling segments is accomplished by the movement in opposite directions of a single set of elements. To move these elements in one direction is the function of springs 1391, while their movement in the reverse direction is caused by the key coupler. Referring to Fig. 12 it will be seen that an arm 142 is fast on shaft 127, and that a lever 143 pivoted on rod 24 is joined to said arm, the lower end 144 of said lever being positioned to be engaged by a by-pass pawl 145 carried by the coupler and engaging the coupler back plate 135. When the coupler rises by depression of a key, the pawl 145 will engage the lower end 144 of said lever and rock said lever thereby causing the locking teeth 1392 of locking elements 139 to engage and hold segments 117 during the rise of slides 122 and the consequent setting of the indicators. When the coupler starts to return the pawl 145 will release the lever 143 and then the springs 1391 may reversely rotate the locking elements, thereby engaging the saw teeth 1393 with the points of the stars thus locking the indicators in adjusted positions and releasing the controlling segments 117.

The usual function of hiding the indicators during their movements may be performed by screens 146 (Fig. 12) pivoted loosely on shaft 127 and having pin and slot connections 148 to a link 149 which is carried by slots surrounding shaft 127 and rod 118, reciprocated by a lever 151 journaled on rod 24 and having a pin and slot connection 152 with said link. The lower part of lever 151 has a slot 150 in which rides cross bar 32 of the key coupler, so that when the coupler moves the elements just described will be operated and the screens 146 will hide the indicators during their movements.

It was before stated that the transfer operating shaft 52 is given one rotation at each operation of the machine. To perform this function, a pinion 51 on one end of said shaft, see Fig. 2, is positioned to be engaged by a segment rack 74, this rack being mounted on rod 35 and having a rigid connection with the coupler cross bar 32. It will be clear from Fig. 2, showing the normal position of the parts, that when rack 74 moves forward by elevation of the coupler, pinion 51 would be engaged and rotated except for the fact that the whole totalizer frame, in which shaft 52 is carried, is elevated, to bring the totalizer elements into gear with the actuating segment racks 3, thus carrying pinion 51 out of reach of the segment rack 74. Therefore, the forward movement of rack 74 produces no rotation of pinion 51, but for the return of the coupler the totalizer frame is depressed, and thus during the backward movement of the rack 74, pinion 51 is engaged therewith and given a complete rotation. It will be seen that this mechanism provides a simple but effective device for converting the two-direction movement of the rack into a uni-direction movement of the transfer shaft 52, and without the use of pawls or other easily derangeable mechanisms. The transfer shaft 52 requires motion in one direction only, but it might become displaced by elevation of the totalizer frame. To prevent this misoperation the plate 86, before referred to, has a downwardly extending arm 87 positioned to be engaged by arms 84 and 85 (Fig. 5) of a plate carried fast by transfer shaft 52. Clearly, when the totalizer frame is elevated the plate arms 84 and 85 will surround locking arm 87 and the transfer shaft 52 will be prevented from rotation until the totalizer frame again descends. Thus accidental rotation of transfer shaft 52 is prevented.

To restore the differential segments 3 to normal position positively, is the function of certain plates 37 shown in Fig. 1. These plates are carried loosely by rod 35 and have hooks 40 extending under the coupler cross bar 32. Each gear segment 3 is provided with a lug 39 above and a lug 38 behind the restoring plates 37. Thus when any gear segment 3 is operated, its lug 38 will rock the corresponding plate 37 around its pivot rod 35. As the coupler returns to normal position the cross bar 32 will engage the hooks 40 of any displaced plates and positively restore them to normal position, thus engaging said plates with the lugs 38 of segments 3 and thereby positively returning the segments also to normal position. The upper lugs 39 prevent the gear segments from moving past zero position as projections 371 of plates 37 engage a stationary bar 372.

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In a machine of the class described, the combination with a frame having portions extending substantially at right angles to each other, of a series of operating keys for engaging one portion of the frame and imparting thereto differential movement while the other portion is constructed to engage the keys and thereby prevent an overthrow of the frame, and an indicator controlled by the frame.

2. In a machine of the class described, the combination with a frame having portions diverging at substantially right angles, of a shaft for supporting the frame, a series of operating keys for engaging one portion of the frame and rotating the same differentially about the shaft, the rotation of the frame carrying the other portion thereof into contact with the keys and thereby limiting the movement of said frame, and an accounting mechanism driven by said frame.

3. In a machine of the class described, the combination with a bank of pivoted keys each having a portion circular to the pivots of said keys, a graduated frame positioned to have the graduations engaged and differently operated by said keys, a graduated plate movable with said frame and positioned to have its graduations strike the circular portions of the keys at the ends of their strokes, and totalizing mechanism operated by said graduated frame.

4. In a machine of the class described, the combination with a frame having substantially right angled portions, of a series of operating keys for engaging one portion of the frame and imparting thereto differential movements while the other portion is constructed to engage the keys and thereby prevent an overthrow of said frame, an indicator, and connections for driving said indicator controlled by the frame, and mechanism operated by the keys after the frame has been arrested for positioning the indicator.

5. In a machine of the class described, the combination with a series of totalizer wheels and a pivoted frame carrying said wheels, of operating devices into connection with which said wheels may be thrown, transfer devices comprising sets of three star-shaped elements rigidly connected, means for actuating any of the sets of elements, and locking elements for said totalizer wheels held in locking position by one element of each set.

6. In a machine of the class described, the combination with a series of totalizer wheels, of means for differentially actuating said wheels, transfer devices comprising sets of three rigidly connected star-shaped elements, a set of locking devices for said totalizer wheels held in locking position by one element in each set, and means for actuating any of the sets of transfer elements to effect transfers.

7. In a machine of the class described, the combination with a series of totalizer wheels, of locking elements for said wheels, and transfer devices for said wheels and having connections for holding said locking elements in locking position.

8. In a machine of the class described, the combination with a series of totalizer elements having transfer tripping projections, of transfer devices comprising sets of three rigidly connected star-shaped devices, a series of helically positioned devices for engaging one device of each set and operating it, and pawls for locking said totalizer elements and having portions normally engaged and held in locking position by another device of each set.

9. In a machine of the class described, the combination with a cylindrical indicator and a star-shaped element connected thereto, of a slide bearing a roller positioned to engage said star-shaped element, a series of keys and connections to position said roller differentially, and connections from said keys to actuate said slide.

10. In a machine of the class described, the combination with a cylindrical indicator, and a star-shaped element connected thereto, of a slide having an approximately circular slot bearing a roller and positioned so that said roller may engage said star-shaped element, a series of keys, a pivoted element differentially adjusted by said keys and having a radial slot in which said roller also rides, and connections whereby said keys may actuate said slide.

11. In a machine of the class described, the combination with a rotatable indicator and an operating device therefor having radiating parts, of an actuating element for said operating device having an approximately circular slot in which a roller rides, and positioned so that said roller may engage said radiating parts, a series of keys, a pivoted element differentially adjusted by said keys and having a radial slot in which said roller also rides, and connections from said keys for moving said actuating element.

12. In a machine of the class described, the combination with a rotatable indicator, and an operating device therefor having radiating parts, of an actuating slide for said operating device having an approximately circular slot in which a roller positioned to engage said radiating parts may ride, a bank of keys, a pivoted element differentially adjusted by said keys and having a radial slot in which said roller also rides, and a key coupler actuated by said keys and constructed to engage and actuate said operating device.

13. In a machine of the class described, the combination with a series of keys, of totalizer elements, and operating devices therefor actuated by said keys, a frame carrying said totalizer elements, a key coupler, a plate having a flange with a cut away portion fast to said coupler, and a by pass pawl pivoted to said totalizer carrying frame and positioned normally so that one end thereof lies in the cut away portion of said flange.

14. In a machine of the class described, the combination with totalizer elements and operating devices therefor, of keys for actuating said operating devices, a bar common to and moved by said keys, a plate having a flange with a cut away portion and fast to said common bar, a pivoted frame carrying said totalizer elements, a by pass pawl mounted on said frame and having one end thereof normally lying in the cut away portion of said flange, and a roller also mounted on said totalizer frame and positioned to ride on said flange.

15. In a machine of the class described, the combination with totalizing elements, and keys controlling the movement thereof, of a pivoted frame carrying said totalizer elements, a pivoted plate having a flange with a cut away portion, an element carried by said totalizer frame and normally engaging said cut away portion, and means for giving said plate excursions of invariable extent.

16. In a machine of the class described, the combination with a set of operating racks, of a series of totalizer wheels respectively in the planes of their operating racks and means for moving them into and out of engagement with said racks, additional totalizer wheels of higher order, and a stationary locking device into locking relation with which said higher order wheels are moved when the lower order wheels are engaged with said operating devices.

17. In a machine of the class described, the combination with a series of indicators and means for adjusting them to desired positions, of devices for determining the extent of adjustment of said indicators, and locking elements moved to one position to lock said adjusting means and to another position to lock said determining devices.

18. In a machine of the class described, the combination with a pivoted frame having two sets of graduations, of totalizing mechanism driven by said frame, and a bank of pivoted keys, having curved edges, engaging one set of said graduations and blocking the other set, and positioned so that the path of each curved edge intersects a straight line passing through the frame pivot and the key pivot.

19. In a machine of the class described, the combination with a pivoted frame having two sets of graduations substantially at right angles to each other, of totalizing mechanism driven by said frame, and a bank of pivoted keys having operating edges curved in a circle around the key pivot and engaging one set of said graduations and blocking the other set, and positioned so that the path of each curved edge intersects a straight line passing through the frame pivot and the key pivot.

20. In a machine of the class described, the combination with a pivoted frame having two sets of graduations, of a totalizing mechanism driven thereby, and a bank of pivoted keys having operating edges, struck on a circle around the key pivot and of less radius than the distance between the key pivot and the frame pivot, and positioned to engage one set of said graduations and to block the other set.

21. In a machine of the class described, the combination with a movable frame and a plurality of totalizer elements carried thereby, of actuators for said elements normally out of engagement therewith, devices for locking said elements when out of engagement with said actuators, means for moving the frame thereby carrying the totalizer elements into engagement with the actuators, and means for moving the devices out of locking position upon movement of the frame.

22. In a machine of the class described, the combination with a movable frame and a plurality of totalizer elements carried thereby, of actuators for said elements normally out of engagement therewith, devices for locking said elements when out of engagement with said actuators, an eccentrically mounted bearing for said locking devices, and means for moving the frame thereby carrying the totalizer elements into engagement with the actuators and for rocking the eccentric bearing as an incident to the movement of the frame thereby withdrawing the locking devices from engagement with the totalizer elements.

23. In a machine of the class described, the combination with a movable frame and a plurality of totalizer elements carried thereby, actuators for said elements normally out of engagement therewith, mechanism for resetting the totalizer elements to zero, devices for locking said elements when out of engagement with said actuators, means for moving the frame and thereby the totalizer elements into engagement with the actuators, and means for withdrawing the locking devices when the totalizer elements are moved into engagement with the actuators and when the resetting mechanism is actuated.

24. In a machine of the class described, the combination with a movable frame and a plurality of totalizer elements carried thereby, of actuators for said elements normally out of engagement therewith, mechanism for resetting the totalizer elements to zero, devices for locking said elements when out of engagement with said actuators, a bearing for said devices eccentrically mounted in the frame, means for moving the frame and thereby the totalizer elements into engagement with the actuators, and means for rocking the eccentrically mounted bearing thereby withdrawing the locking devices from engagement with the totalizer elements upon the movement of the frame carrying said elements and upon the actuation of the resetting mechanism.

25. In a machine of the class described, the combination with a movable frame and a plurality of totalizer elements carried thereby, of actuators for said elements normally out of engagement therewith, mechanism for transferring from any one of the elements to the next higher one, devices under the control of the transferring mechanism for locking the elements of the totalizer when said elements are out of engagement with the actuators, a bearing for said locking devices eccentrically mounted in the frame, means for moving the frame and thereby the totalizer elements into engagement with the actuators, and means for rocking the eccentrically mounted bearing, thereby withdrawing the locking devices from engagement with the totalizer elements and from the control of the transferring mechanism upon the movement of the frame carrying said elements and upon the actuation of the resetting mechanism.

26. In a machine of the class described, the combination with a pivotally mounted frame having longitudinally extending portions also projecting laterally at substantially right angles to each other, of a series of operating keys for engaging one of these portions, and imparting differential movement to the frame and to be engaged by the other portion when the frame has been differentially positioned to prevent overthrow of the frame, and an indicator controlled from the frame.

27. In a machine of the class described, the combination with a movable frame having a plurality of projecting portions, of a series of keys adapted to engage one of the projecting portions and position the movable frame differentially and to be engaged by the other when the frame is positioned to prevent overthrow of the frame, the construction being such that when the second projecting portion engages the keys, the first will clear them and allow further movement of the keys after the frame has been positioned.

28. In a machine of the class described, the combination with a frame having longitudinally extending flanges diverging substantially at right angles to each other, a shaft extending longitudinally through and pivotally supporting the frame, a series of pivoted keys adapted to engage at their tops one of the flanges on the frame and move the frame about its supporting shaft and to be engaged at their ends by the other flange to limit the movement and prevent overthrow of the frame, and accounting mechanism controlled by the frame.

29. In a machine of the class described, the combination with a pivotally supported frame having laterally projecting portions diverging at less than 180 degrees, of a series of levers adapted to selectively engage at their tops one of the projecting portions and move the frame differentially about its pivot and to be engaged at their ends by the other projecting portion of the frame to prevent overthrow of the frame, the construction being such that when the ends of the levers are engaged by the second projecting portion of the frame the first projecting portion will clear their tops and permit further movement of the levers.

30. In a machine of the class described, the combination with a pivotally mounted frame having a plurality of longitudinally extending laterally diverging stepped portions, of a series of key levers adapted to selectively engage one of the portions of the frame to differentially swing the frame about its pivot and then be operatively disengaged from such portion and to be engaged by the other portion to prevent further movement of the frame with the key levers.

31. In a machine of the class described, the combination with a plurality of keys, of an indicator, and connections whereby the keys always set the indicator over the shorter of the possible routes.

32. In a machine of the class described, the combination with a plurality of keys, of an indicator, determining mechanism for the indicator set by the keys, and means also actuated by the keys for actuating the determining mechanism to set the indicator.

33. In a machine of the class described, the combination with an indicator, of determining mechanism therefor, a series of keys for differentially positioning the determining mechanism, and connections operated from the keys for positioning the indicator in accordance with the position of the determining mechanism whereby the indicator is moved the least extent in being set.

34. In a machine of the class described, the combination with an indicator, of a plurality of keys, and connections for setting the indicator from the keys including an element differentially positioned by the keys and means also operated by the keys for operating said element to set the indicator in accordance with the differentially positioned element.

35. In a machine of the class described, the combination with a plurality of rotary indicator units, of a plurality of sets of keys, and connections whereby the keys of each set differentially position the corresponding indicator unit by rotating it in the direction requiring the less travel.

36. In a cash register, the combination with a series of key levers, of a member movable upon the depression of any of said levers, a graduated element movable differential distances dependent upon the particular key operated, an oscillatory indicator, means for turning said indicator, and mechanism connecting the latter means both with the said member and with the graduated element whereby, upon the operation of a key, the said member and element coöperate to set the indicator.

37. In a cash register, the combination with a series of key levers, of a member movable upon the depression of any of said levers, a graduated yoke movable differential distances dependent upon the particular key operated, an oscillatory indicator, a toothed device for turning said indicator, and mechanism connecting the said device both with the said member and with the graduated yoke whereby, upon the operation of a key, the said member and yoke coöperate to set the indicator.

38. In a cash register, the combination with a bank of keys arranged in denominational series, of a key-coupler coöperating with all of said keys and movable with the same throughout their entire strokes, of a differential mechanism for each denominational series of the keys, said mechanisms being moved distances dependent upon the particular keys operated, oscillatory indicators, and connections between said indicators and the key-coupler and between each of the indicators and the corresponding differential mechanism, said connections coöperating, upon the depression of a key in two or more series, to set the indicators.

39. In a cash register, the combination with a bank of keys arranged in denominational series, of a coupler coöperating with and movable by any key in the bank, a graduated member for each denominational series of keys, said members being moved distances dependent upon the keys in the corresponding series that are operated, a rocking member connected with each graduated member, an oscillatory indicator for each denominational series of keys, and means connecting each of said indicators with both the coupler and with the corresponding rocking member whereby, upon the operation of a key, the corresponding indicator is turned to display the value of said key.

40. In a cash register, the combination with a bank of keys arranged in denominational series, of a key-coupler coöperating with each of said keys, a graduated yoke for each denominational series and movable differential distances dependent upon the key in the series that is operated, an oscillatory indicator for each series of keys, a pinion connected with each indicator, a toothed member for and engaging with each of said pinions for turning the indicators, and means connecting the toothed members with both the key-coupler and with the corresponding graduated yoke whereby, upon the depression of a key in one of the series, the corresponding indicator is turned to display the indication identifying said key.

41. In a cash register, the combination with a series of keys, of a key-coupler coöperating therewith, a graduated yoke also coöperating with said keys and movable different distances thereby, a rod, a rocking member pivoted on said rod, means connecting the member with the said yoke, an oscillatory indicator, a pinion on the indicator, a toothed member meshing with the indicator pinion, a resetting plate connected with both the toothed member and the rocking member, and means on said resetting plate extending into position for engagement by the key-coupler, as and for the purpose specified.

42. In a cash register, the combination with a group of keys, of an indicator carrying a plurality of indicia and movable to different positions for display of same severally, an element moved the same distance by all of the keys, a second element moved a different distance by each of the keys, and mechanism actuated by said elements at each operation whereby the indicator may be driven directly from one indicating position to another by selective operation of the keys.

43. In a cash register, the combination with a group of keys, of an indicator carrying a plurality of indicia and movable to different positions for display of same severally, an element moved the same distance by all of the keys, a second element moved a different distance by each of the keys, and mechanism actuated by said elements at each operation whereby the indicator may be driven from one indicating position to another by selective operation of the keys, the movement of the indicator invariably being over the shortest distance from the position in which the indicator was left by the previous operation to the new position.

In testimony whereof I affix my signature in the presence of two witnesses.

JOHN A. WERNER.

Witnesses:
F. E. HAMILTON,
R. RUMMLER.

Copies of this patent may be obtained for five cents each, by addressing the "Commissioner of Patents, Washington, D. C."